US012633269B2

(12) United States Patent
Wu et al.

(10) Patent No.: US 12,633,269 B2
(45) Date of Patent: May 19, 2026

(54) DISPLAY DEVICE AND OPERATING METHOD FOR DISPLAY DEVICE

(71) Applicant: E Ink Holdings Inc., Hsinchu (TW)

(72) Inventors: Chi-Liang Wu, Hsinchu (TW); Wei-Tsung Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/818,509

(22) Filed: Aug. 28, 2024

(65) Prior Publication Data

US 2025/0149004 A1 May 8, 2025

(30) Foreign Application Priority Data

Nov. 8, 2023 (TW) ................................ 112142951

(51) Int. Cl.
*G09G 3/34* (2006.01)

(52) U.S. Cl.
CPC ..... *G09G 3/344* (2013.01); *G09G 2300/0814* (2013.01); *G09G 2310/08* (2013.01); *G09G 2320/02* (2013.01)

(58) Field of Classification Search
CPC ........... G09G 3/344; G09G 2300/0814; G09G 2310/08; G09G 2320/02
See application file for complete search history.

(56) References Cited

U.S. PATENT DOCUMENTS 7,167,151 B2 * 1/2007 Yamashita ........... G09G 3/3688 345/98
9,542,872 B2 * 1/2017 Huang ................... G09G 3/344
10,783,827 B2 * 9/2020 Shin ..................... G09G 3/3258
2008/0062089 A1 * 3/2008 Kim ..................... G09G 3/3275 345/76
2010/0238158 A1 * 9/2010 Yoshida ................... G09G 3/16 345/107

(Continued)

FOREIGN PATENT DOCUMENTS

CN 101673503 3/2010
CN 107871466 4/2018

(Continued)

OTHER PUBLICATIONS

"Office Action of China Counterpart Application", issued on Aug. 28, 2025, p. 1-p. 7.

(Continued)

*Primary Examiner* — Ke Xiao
*Assistant Examiner* — Jennifer L Zubajlo
(74) *Attorney, Agent, or Firm* — JCIPRNET

(57) ABSTRACT

A display device and an operating method for the display device are provided. The display device includes a pixel array, a multiplexer circuit, and a holding circuit. The pixel array includes a first pixel column and a second pixel column. The multiplexer circuit provides a first data signal to the first pixel column during a first period and provides a second data signal to the second pixel column during a second period. The holding circuit provides a reference signal to the second pixel column during the first period to maintain a display result of the second pixel column during a previous period and provides the reference signal to the first pixel column during the second period to maintain a display result of the first pixel column during the first period.

10 Claims, 5 Drawing Sheets

(56) References Cited

U.S. PATENT DOCUMENTS

| | | | | |
|---|---|---|---|---|
| 2011/0261031 | A1* | 10/2011 | Muto | G06F 3/04184<br>345/204 |
| 2013/0249886 | A1* | 9/2013 | Fujimori | G09G 3/344<br>345/212 |
| 2017/0169756 | A1* | 6/2017 | Kim | G09G 3/2092 |
| 2021/0217367 | A1 | 7/2021 | Amirkhany et al. | |
| 2022/0036829 | A1* | 2/2022 | Jeong | G09G 3/3275 |

FOREIGN PATENT DOCUMENTS

| | | | | |
|---|---|---|---|---|
| CN | 115376454 | | 11/2022 | |
| TW | 1758410 B | * | 3/2022 | G09G 3/3225 |

OTHER PUBLICATIONS

"Notice of allowance of China Counterpart Application", issued on Mar. 9, 2026, p. 1-p. 4.

* cited by examiner

DISPLAY DEVICE AND OPERATING METHOD FOR DISPLAY DEVICE

CROSS-REFERENCE TO RELATED APPLICATION

This application claims the priority benefit of Taiwan application serial no. 112142951, filed on Nov. 8, 2023. The entirety of the above-mentioned patent application is hereby incorporated by reference herein and made a part of this specification.

BACKGROUND

Technical Field

The disclosure relates to an electronic device and an operating method for the electronic device, and more particularly to a display device and an operating method for the display device.

Description of Related Art

The display device includes multiple pixel columns and multiplexers. The multiplexer is coupled to the first pixel column and the second pixel column among the pixel columns. The multiplexer provides the data signal to the first pixel column first during a frame period and causes the second pixel column not to receive the data signal first. Thus, when the first pixel column among the pixel columns is driven in response to the data signal, the second pixel column adjacent to the first pixel column maintains the display result according to the data signal of the previous frame period.

However, in the above display architecture, the data signal of the previous frame period may be changed by leakage or by interference of other data signals. Thus, the display result maintained by the second pixel column changes. It may be seen that based on the above display architecture, how to ensure that the pixel column can maintain the display result during the previous frame period is one of the research focuses of those skilled in the art.

SUMMARY

The disclosure provides a display device and an operating method for the display device, which may ensure that the pixel column of the display device maintains the display result during the previous period.

The display device of the disclosure includes a pixel array, a multiplexer circuit and a holding circuit. The pixel array includes a first pixel column and a second pixel column. The multiplexer circuit is coupled to the first pixel column and the second pixel column. The multiplexer circuit provides a first data signal to the first pixel column during a first period and provides a second data signal to the second pixel column during a second period, and the holding circuit is coupled to the first pixel column and the second pixel column. The holding circuit provides a reference signal to the second pixel column during the first period to maintain a display result of the second pixel column during a previous period and provides the reference signal to the first pixel column during the second period to maintain a display result of the first pixel column during the first period.

The operating method of the disclosure is used for the display device. The display device includes a pixel array. The pixel array includes a first pixel column and a second pixel column. The operating method is described below. A first data signal is provided to the first pixel column during a first period. A reference signal is provided to the second pixel column during the first period to maintain a display result of the second pixel column during a previous period. A second data signal is provided to the second pixel column during a second period. The reference signal is provided to the first pixel column during the second period to maintain a display result of the first pixel column during the first period.

Based on the above, during the first period, the display result of the second pixel column during the previous period may be maintained based on the reference signal. During the second period, the display result of the first pixel column during the first period may be maintained based on the reference signal. In this way, the display device of the disclosure may ensure that the pixel column maintains the display result during the previous period.

DESCRIPTION OF THE EMBODIMENTS

Some embodiments of the disclosure accompanied with the drawings will now be described in detail. These examples are only a portion of the disclosure and do not disclose all possible embodiments of the disclosure. More precisely, these embodiments are only examples within the scope of the patent application of the disclosure.

Figure 1:
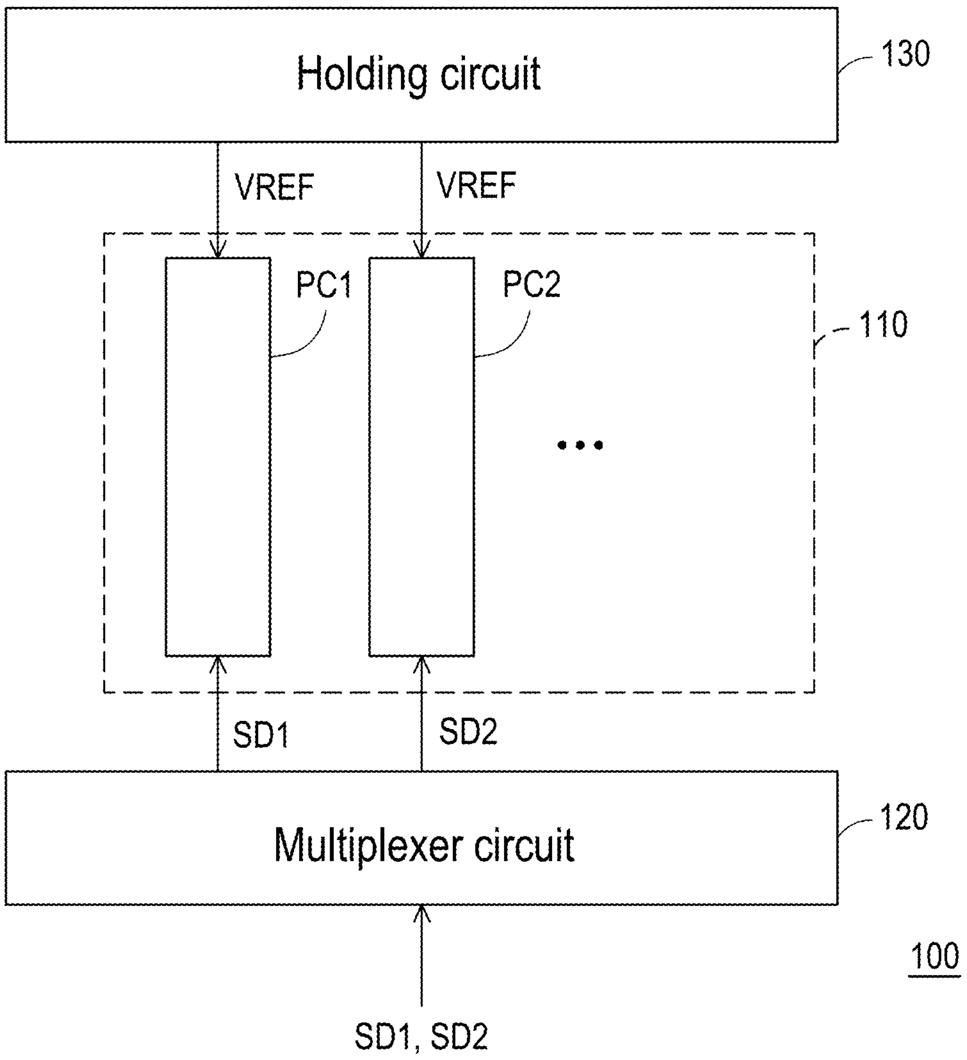
FIG. 1 is a schematic view of the display device according to one embodiment of the disclosure.

Referring to FIG. 1, FIG. 1 is a schematic view of the display device according to one embodiment of the disclosure. In this embodiment, the display device 100 includes a pixel array 110, a multiplexer circuit 120, and a holding circuit 130. The pixel array 110 at least includes pixel columns PC1 and PC2. In this embodiment, the pixel column PC1 includes multiple pixel circuits arranged in the column direction. The pixel column PC2 includes multiple pixel circuits arranged in the column direction.

In this embodiment, the multiplexer circuit 120 is coupled to the pixel columns PC1 and PC2. During the first frame period, the multiplexer circuit 120 provides a data signal SD1 to the pixel column PC1. During the second frame period, the multiplexer circuit 120 provides a data signal SD2 to the pixel column PC2. The above frame periods may also be a specific period (time interval). The period mentioned in the disclosure is not limited to the frame period.

In this embodiment, the holding circuit 130 is coupled to the pixel columns PC1 and PC2. The holding circuit 130 provides a reference signal VREF to the pixel column PC2 during the first frame period to maintain a display result of the pixel column PC2 during a previous frame period. The holding circuit 130 provides the reference signal VREF to the pixel column PC1 during the second frame period to maintain a display result of the pixel column PC1 during the first frame period.

It is worth mentioning here that the holding circuit 130 uses the reference signal VREF during the first frame period to maintain the display result of the pixel column PC2 during the previous frame period. The holding circuit 130 uses the reference signal VREF during the second frame period to maintain the display result of the pixel column PC1 during the previous frame period. The holding circuit 130 may ensure that the pixel columns PC1 and PC2 maintain the display result during the previous frame period. In this way, the display results of the pixel columns PC1 and PC2 are not changed due to long-term leakage or interference from other data signals.

In this embodiment, the pixel columns PC1 and PC2 may be adjacent pixel column pairs. The data signals SD1 and SD2 may be the same as each other or different from each other.

For example, the display device 100 may be a bistable display (but the disclosure is not limited thereto). The display device 100 may be an electro-phoretic display (EPD). The pixel columns PC1 and PC2 are adjacent to each other. The pixel column PC1 receives the data signal SD1 during the first frame period. The pixel column PC2 receives the reference signal VREF during the first frame period. Thus, the display result of the pixel column PC2 during the first frame period may be maintained without interference from the data signal SD1. The reference signal VREF may be a reference a low voltage signal (such as ground or a voltage signal with 0 volts).

The pixel column PC2 receives the data signal SD2 during the second frame period. The pixel column PC1 receives the reference signal VREF during the second frame period. Thus, the display result of the pixel column PC1 during the second frame period may be maintained without interference from the data signal SD2.

Figure 2:
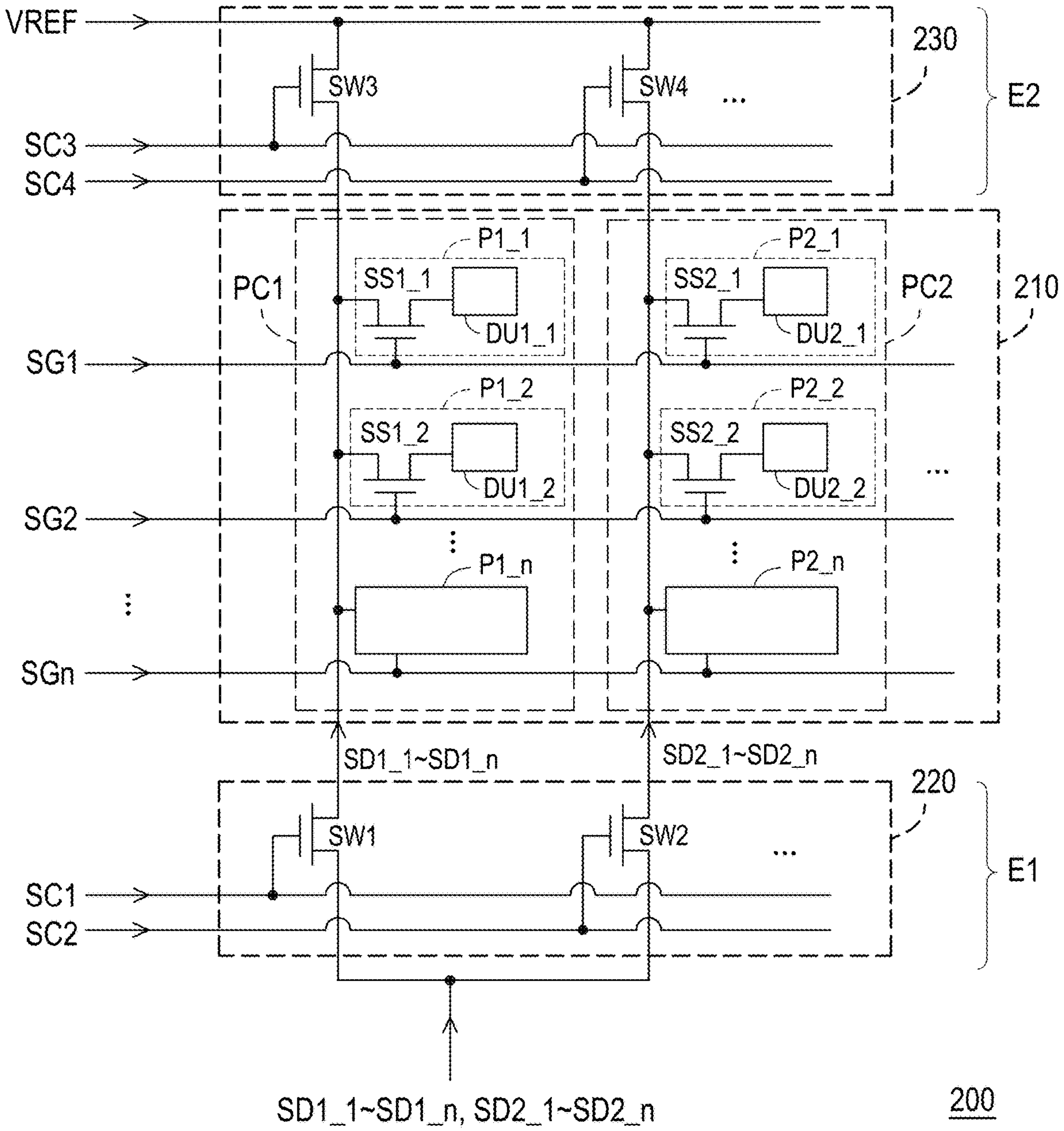
FIG. 2 is a circuit schematic view of the display device according to the first embodiment of the disclosure.

Referring to FIG. 2, FIG. 2 is a circuit schematic view of the display device according to the first embodiment of the disclosure. In this embodiment, the display device 200 includes a pixel array 210, a multiplexer circuit 220, and a holding circuit 230. The pixel array 210 at least includes pixel columns PC1 and PC2. In this embodiment, the pixel column PC1 includes pixel circuits P1_1 to P1_*n*. The pixel column PC2 includes pixel circuits P2_1 to P2_*n*.

In this embodiment, the multiplexer circuit 220 is coupled to the pixel columns PC1 and PC2. The multiplexer circuit 220 includes at least selection switches SW1 and SW2. The first terminal of the selection switch SW1 receives one of the data signals SD1_1 to SD1_*n* during the first frame period. The second terminal of the selection switch SW1 is coupled to the pixel column PC1. The control terminal of the selection switch SW1 receives the switch control signal SC1. The first terminal of the selection switch SW2 receives one of the data signals SD2_1 to SD2_*n* during the second frame period. The second terminal of the selection switch SW2 is coupled to the pixel column PC2. The control terminal of the selection switch SW2 receives the switch control signal SC2. In this embodiment, the data signals SD1_1 to SD1_*n* and SD2_1 to SD2_*n* are provided by the data driving circuit, respectively (however, the disclosure is not limited thereto).

In this embodiment, the holding circuit 230 is coupled to the pixel columns PC1 and PC2. The holding circuit 230 at least includes holding switches SW3 and SW4. The first terminal of the holding switch SW3 receives the reference signal VREF. The second terminal of the holding switch SW3 is coupled to the pixel column PC1. The control terminal of the holding switch SW3 receives the switch control signal SC3. The first terminal of the holding switch SW4 receives the reference signal VREF. The second terminal of the holding switch SW4 is coupled to the pixel column PC2. The control terminal of the holding switch SW4 receives the switch control signal SC4.

In this embodiment, the multiplexer circuit 220 is located on the first side E1 of the pixel array 210. The holding circuit 230 is located on the second side E2 of the pixel array 210. The first side E1 is different from the second side E2. For example, the first side E1 and the second side E2 are opposite to each other (but the disclosure is not limited thereto).

In this embodiment, the selection switches SW1, SW2 and the holding switches SW3, SW4 are implemented by N-type field-effect transistors or N-type thin film transistors, respectively. In some embodiments, the selection switches SW1, SW2 and the holding switches SW3, SW4 are implemented by P-type field-effect transistors or P-type thin film transistors, respectively.

In this embodiment, the pixel circuits P1_1 and P2_1 are located in the same row. The pixel circuit P1_1 includes the selection circuit SS1_1 and the display unit DU1_1. The first terminal of the selection circuit SS1_1 is coupled to the second terminal of the selection switch SW1 and the second terminal of the holding switch SW3. The second terminal of the selection circuit SS1_1 is coupled to the display unit DU1_1. The control terminal of the selection circuit SS1_1 receives the scanning signal SG1. The pixel circuit P2_1 includes the selection circuit SS2_1 and the display unit DU2_1. The first terminal of the pixel circuit P2_1 is coupled to the second terminal of the selection switch SW2 and the second terminal of the holding switch SW4. The second terminal of the selection circuit SS2_1 is coupled to the display unit DU2_1. The control terminal of the selection circuit SS2_1 receives the scanning signal SG1. In some embodiments, the pixel circuits P1_1 and P2_1 may be used as pixel pairs.

The pixel circuits P1_2 and P2_2 are located in the same row. The pixel circuit P1_2 includes the selection circuit SS1_2 and the display unit DU1_2. The first terminal of the selection circuit SS1_2 is coupled to the second terminal of the selection switch SW1 and the second terminal of the holding switch SW3. The second terminal of the selection circuit SS1_2 is coupled to the display unit DU1_2. The control terminal of the selection circuit SS1_2 receives the scanning signal SG2. The pixel circuit P2_2 includes the selection circuit SS2_2 and the display unit DU2_2. The first terminal of the pixel circuit P2_2 is coupled to the second terminal of the selection switch SW2 and the second terminal of the holding switch SW4. The second terminal of the selection circuit SS2_2 is coupled to the display unit DU2_2. The control terminal of the selection circuit SS2_2 receives the scanning signal SG2. In some embodiments, the pixel circuits P1_2 and P2_2 may be used as pixel pairs.

In this embodiment, the pixel circuits P1_*n* and P2_*n* are located in the same row. In some embodiments, the pixel circuits P1_*n* and P2_*n* may be used as pixel pairs.

In this embodiment, the selection circuits SS1_1, SS1_2, SS2_1, and SS2_2 are implemented by N-type field-effect transistors or N-type thin film transistors, respectively. In some embodiments, the selection circuits SS1_1, SS1_2, SS2_1, and SS2_2 are implemented by P-type field-effect transistors or P-type thin film transistors, respectively.

For example, the display device 200 may be an electro-phoretic display (but the disclosure is not limited thereto). The display units DU1_1, DU1_2, DU2_1, and DU2_2 may respectively be display elements having multiple electro-phoretic microcapsules. The electrophoretic microcapsules may be electrophoretic particles with specific colors. The "specific colors" may be black, white, or other colors. The display units DU1_1, DU1_2, DU2_1, and DU2_2 respectively generate electrophoresis polarity according to the voltage value of the received data signal and use the electrophoresis polarity to move the electrophoretic microcapsules to provide a display result corresponding to the data signal. Furthermore, the voltage value of the reference signal VREF does not change the electrophoresis polarity. Thus, the display units DU1_1, DU1_2, DU2_1, and DU2_2 maintain the display result during the previous frame period according to the reference signal VREF.

Figure 3:
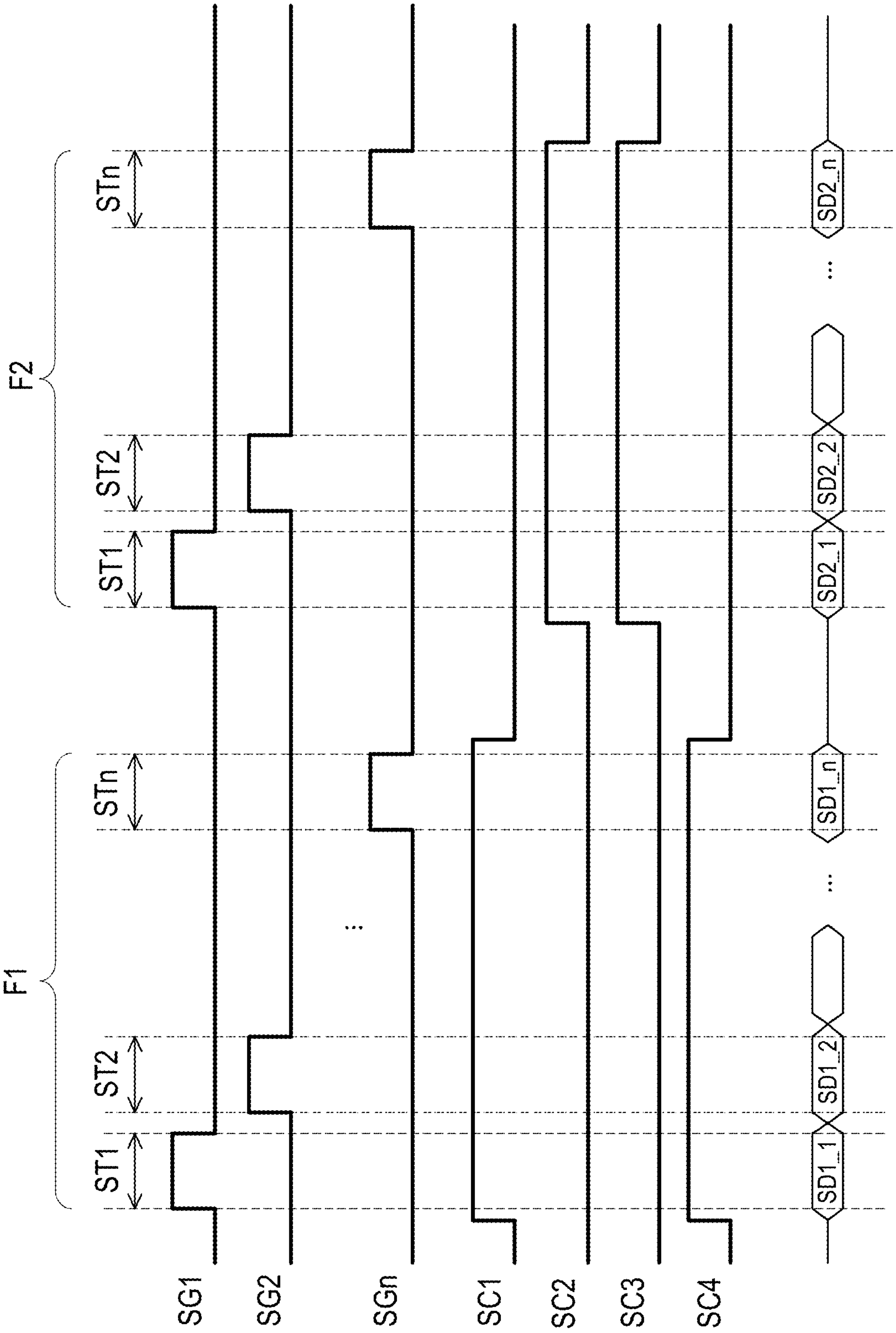
FIG. 3 is a signal timing diagram according to one embodiment of the disclosure.

Referring to FIG. 2 and FIG. 3 at the same time, FIG. 3 is a signal timing diagram according to one embodiment of the disclosure. During the first frame period F1, the switch control signals SC1 and SC4 have high voltage levels. The switch control signals SC2 and SC3 have low voltage levels. Thus, the selection switch SW1 and the holding switch SW4 are turned on. The selection switch SW2 and the holding switch SW3 are turned off.

During the display period ST1 of the first frame period F1, the scanning signal SG1 has a high voltage level. Thus, the pixel circuits P1_1 and P2_1 located in the same row are selected and switched based on the scanning signal SG1. The selection circuits SS1_1 and SS2_1 are turned on. During the display period ST1 of the first frame period F1, the pixel circuit P1_1 operates to change the first unit screen of the display unit DU1_1 in response to the data signal SD1_1. The display unit DU1_1 provides the display result according to the data signal SD1_1. In addition, the pixel circuit P2_1 maintains the unit screen during the previous frame period in response to the reference signal VREF. The voltage value of the reference signal VREF is not enough to change the display result. Thus, the display unit DU2_1 maintains the display result during the previous frame period according to the reference signal VREF.

During the display period ST2 of the first frame period F1, the scanning signal SG2 has a high voltage level. Thus, the pixel circuits P1_2 and P2_2 located in the same row are selected and switched based on the scanning signal SG2. The selection circuits SS1_2 and SS2_2 are turned on. During the display period ST2 of the first frame period F1, the pixel circuit P1_2 operates in response to the data signal SD1_2. The display unit DU1_2 provides the display result according to the data signal SD1_2. In addition, the pixel circuit P2_2 maintains the display result during the previous frame period in response to the reference signal VREF. The display unit DU2_2 maintains the display result during the previous frame period according to the reference signal VREF.

During the display period STn of the first frame period F1, the scanning signal SGn has a high voltage level. Thus, the pixel circuits P1_*n* and P2_*n* located in the same row are selected and switched based on the scanning signal SGn. The pixel circuit P1_*n* operates in response to the data signal SD1_*n*. The pixel circuit P2_*n* maintains the display result during the previous frame period in response to the reference signal VREF.

During the second frame period F2, the switch control signals SC1 and SC4 have low voltage levels. The switch control signals SC2 and SC3 have high voltage levels. Thus, the selection switch SW1 and the holding switch SW4 are turned off. The selection switch SW2 and the holding switch SW3 are turned on.

During the display period ST1 of the second frame period F2, the scanning signal SG1 has a high voltage level. Thus, the pixel circuits P1_1 and P2_1 located in the same row are selected and switched based on the scanning signal SG1. The selection circuits SS1_1 and SS2_1 are turned on. During the display period ST1 of the second frame period F2, the pixel circuit P2_1 operates to change the second unit screen of the display unit DU2_1 in response to the data signal SD2_1. The display unit DU2_1 provides the display result according to the data signal SD2_1. In addition, the pixel circuit P1_1 maintains the first unit screen during the first frame period F1 in response to the reference signal VREF. The display unit DU2_1 maintains the display result during the first frame period F1 according to the reference signal VREF.

During the display period ST2 of the second frame period F2, the scanning signal SG2 has a high voltage level. Thus, the pixel circuits P1_2 and P2_2 located in the same row are selected and switched based on the scanning signal SG2. The selection circuits SS1_2 and SS2_2 are turned on. During the display period ST2 of the second frame period F2, the pixel circuit P2_2 operates in response to the data signal SD2_2. The display unit DU2_2 provides the display result according to the data signal SD2_2. In addition, the pixel circuit P1_2 maintains the display result during the first frame period F1 in response to the reference signal VREF. The display unit DU2_2 maintains the display result during the first frame period F1 according to the reference signal VREF.

During the display period STn of the second frame period F2, the scanning signal SGn has a high voltage level. Thus, the pixel circuits P1_*n* and P2_*n* located in the same row are selected and switched based on the scanning signal SGn. During the display period STn of the second frame period F2, the pixel circuit P2_*n* operates in response to the data signal SD2_*n*. In addition, the pixel circuit P1_*n* maintains the display result during the first frame period F1 in response to the reference signal VREF.

In this embodiment, the scanning signals SG1 to SGn are provided by the gate driving circuit, respectively (however, the disclosure is not limited thereto).

Figure 4:
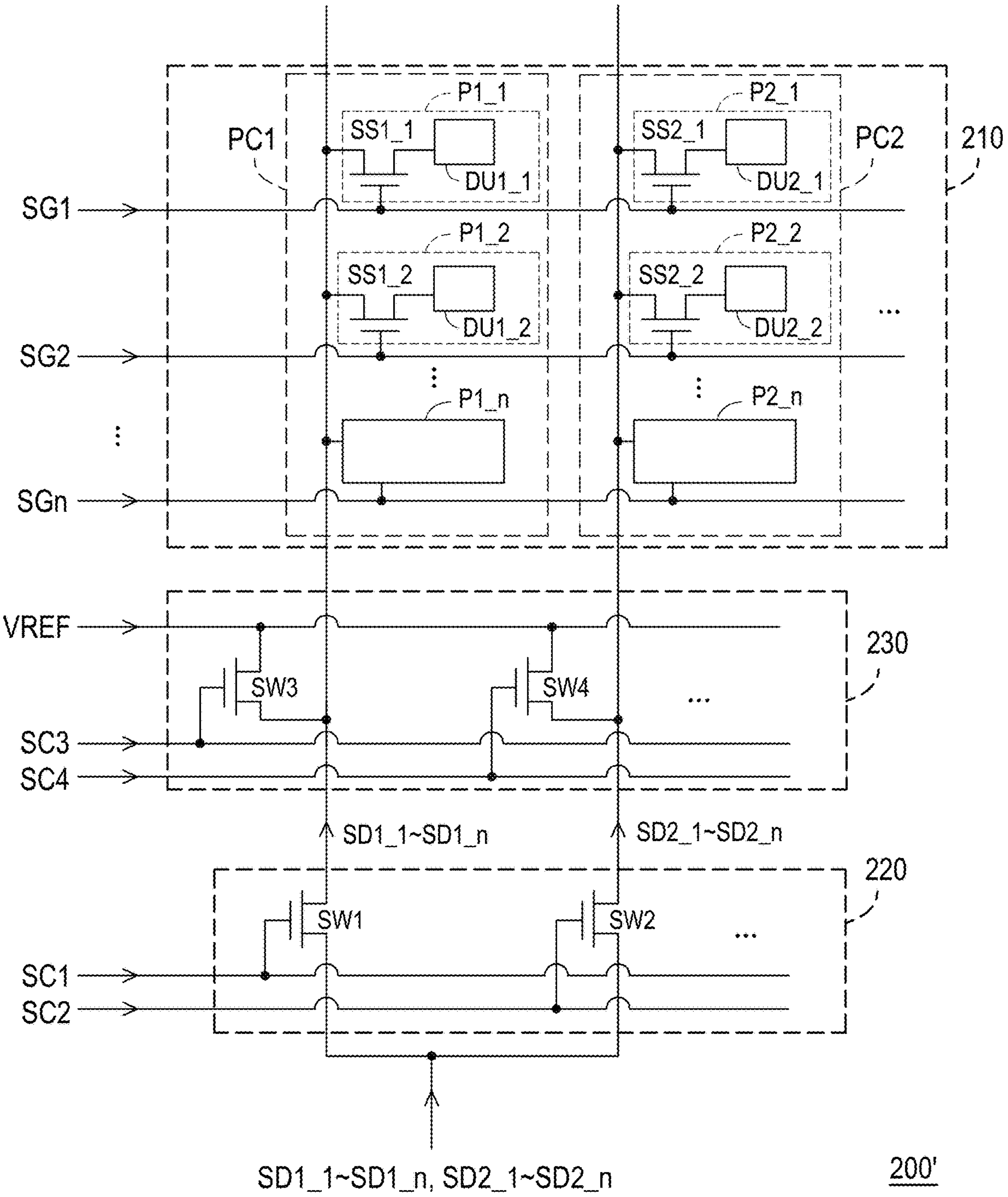
FIG. 4 is a circuit schematic view of the display device according to the second embodiment of the disclosure.

Referring to FIG. 4, FIG. 4 is a circuit schematic view of the display device according to the second embodiment of the disclosure. In this embodiment, the display device 200' includes a pixel array 210, a multiplexer circuit 220, and a holding circuit 230. The circuit implementation of the pixel array 210, the multiplexer circuit 220, and the holding circuit 230 has been clearly described in the embodiments of FIG. 2 and FIG. 3, so they are not repeated herein. In contrast to FIG. 2, the multiplexer circuit 220 and the holding circuit 230 of the display device 200' are located on the same side of the pixel array 210. For example, the multiplexer circuit 220 and the holding circuit 230 are located on the first side E1 of the pixel array 210 (however, the disclosure is not limited thereto). Thus, the sides other than the first side E1 of the display device 200' are allowed to have narrow bezels.

In this embodiment, the holding circuit 230 is provided between the pixel array 210 and the multiplexer circuit 220. In some embodiments, the multiplexer circuit 220 is provided between the pixel array 210 and the holding circuit 230.

Figure 5:
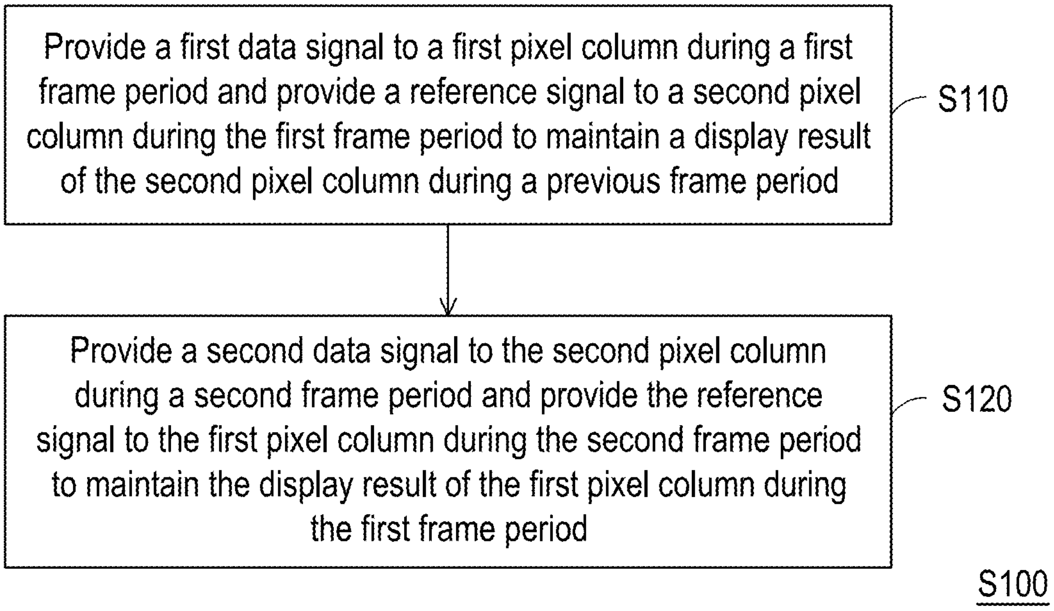
FIG. 5 is a flowchart of the operating method according to one embodiment of the disclosure.

Referring to FIG. 1 and FIG. 5 at the same time, FIG. 5 is a flowchart of the operating method according to one embodiment of the disclosure. In this embodiment, an operating method S100 is used for the display device 100. The operating method S100 includes steps S110 and S120. In step S110, the multiplexer circuit 120 provides the data signal SD1 to the pixel column PC1 during the first frame period. In addition, the holding circuit 130 provides the reference signal VREF to the pixel column PC2 during the first frame period to maintain the display result of the pixel column PC2 during the previous frame period.

In step S120, the multiplexer circuit 120 provides the data signal SD2 to the pixel column PC2 during the second frame period. In addition, the holding circuit 130 provides the reference signal VREF to the pixel column PC1 during the second frame period to maintain the display result of the pixel column PC1 during the first frame period.

The operating method S100 may also be applied to the display device 200 shown in FIG. 2 and the display device 200' shown in FIG. 4.

The implementation details of steps S110 and S120 may be sufficiently taught in the embodiments of FIG. 1 to FIG. 3, so they are not repeated herein.

To sum up, the display device uses the reference signal VREF to maintain the display result of the pixel column in the pixel array during the previous frame period. In this way, the display results of the pixel columns are not changed due to long-term leakage or interference from other data signals.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A display device, comprising:

a pixel array, comprising a first pixel column and a second pixel column;

a multiplexer circuit, coupled to the first pixel column and the second pixel column, providing a first data signal to the first pixel column during a first period, and providing a second data signal to the second pixel column during a second period; and a holding circuit, coupled to the first pixel column and the second pixel column, providing a reference signal to the second pixel column during the first period to maintain a display result of the second pixel column during a previous period, and providing the reference signal to the first pixel column during the second period to maintain a display result of the first pixel column during the first period, wherein the holding circuit comprising a first holding switch and a second holding switch, wherein during the first period, the second holding switch is turned on to provide the reference signal to the second pixel column, and the first holding switch is turned off, wherein during the second period, the first holding switch is turned on to provide the reference signal to the first pixel column, and the second holding switch is turned off, and wherein the reference signal is a voltage signal with a fixed low voltage level.

2. The display device according to claim 1, wherein the multiplexer circuit comprises:

a first selection switch, wherein a first terminal of the first selection switch receives the first data signal during the first period, a second terminal of the first selection switch is coupled to the first pixel column, and a control terminal of the first selection switch receives a first switch control signal; and a second selection switch, wherein a first terminal of the second selection switch receives the second data signal during the second period, a second terminal of the second selection switch is coupled to the second pixel column, and a control terminal of the second selection switch receives a second switch control signal.

3. The display device according to claim 2, wherein:

a first terminal of the first holding switch receives the reference signal, a second terminal of the first holding switch is coupled to the first pixel column, and a control terminal of the first holding switch receives a third switch control signal; and a first terminal of the second holding switch receives the reference signal, a second terminal of the second holding switch is coupled to the second pixel column, and a control terminal of the second holding switch receives a fourth switch control signal.

4. The display device according to claim 3, wherein during the first period, the first selection switch is turned on, and the second selection switch is turned off.

5. The display device according to claim 3, wherein during the second period, the first selection switch is turned off, and the second selection switch is turned on.

6. The display device according to claim 1, wherein the first pixel column comprises a first pixel circuit, the first pixel circuit is selected and switched based on a scanning signal, during the first period, a first unit screen corresponding to a display unit is changed in response to the first data signal, and during the second period, the first unit screen during the first period is maintained in response to the reference signal.

7. The display device according to claim 6, wherein the second pixel column comprises a second pixel circuit, the second pixel circuit and the first pixel circuit are located in a same row, and the second pixel circuit is selected and switched based on the scanning signal, during the second period, a second unit screen corresponding to a display unit is changed in response to the second data signal, and during the first period, another unit screen during a previous period is maintained in response to the reference signal.

8. The display device according to claim 1, wherein the multiplexer circuit and the holding circuit are located on a same side of the pixel array.

9. The display device according to claim 1, wherein the multiplexer circuit is located on a first side of the pixel array, the holding circuit is located on a second side of the pixel array, and the first side is different from the second side.

10. An operating method for a display device, wherein the display device comprises a pixel array, the pixel array comprises a first pixel column and a second pixel column, and the operating method comprises:

providing a first data signal to the first pixel column during a first period, and providing a reference signal to the second pixel column during the first period to maintain a display result of the second pixel column during a previous period; and providing a second data signal to the second pixel column during a second period, and providing the reference signal to the first pixel column during the second period to maintain a display result of the first pixel column during the first period, wherein the display device comprises a holding circuit, the holding circuit comprises a first holding switch and a second holding switch, and the operating method comprises:

during the first period, turning on the second holding switch to provide the reference signal to the second pixel column, and turning off the first holding switch, during the second period, turning on the first holding switch to provide the reference signal to the first pixel column, and turning off the second holding switch, and the reference signal is a voltage signal with a fixed low voltage level.

* * * * *